(12) United States Patent
Döring

(10) Patent No.: US 8,404,011 B2
(45) Date of Patent: Mar. 26, 2013

(54) METHOD AND DEVICE FOR THE REGENERATION OF A PARTICLE FILTER ARRANGED IN THE EXHAUST GAS TRACT OF AN INTERNAL COMBUSTION ENGINE

(75) Inventor: Andreas Döring, München (DE)

(73) Assignee: Man Nutzfahrzeuge AG, Munich (DE)

(*) Notice: Subject to any disclaimer, the term of this patent is extended or adjusted under 35 U.S.C. 154(b) by 618 days.

(21) Appl. No.: 12/540,006

(22) Filed: Aug. 12, 2009

(65) Prior Publication Data
US 2010/0037768 A1 Feb. 18, 2010

(30) Foreign Application Priority Data
Aug. 12, 2008 (DE) .......................... 10 2008 038 720

(51) Int. Cl.
- B01D 50/00 (2006.01)
- B01D 39/06 (2006.01)
- B01D 39/16 (2006.01)
- B01D 24/00 (2006.01)
- F01N 3/00 (2006.01)

(52) U.S. Cl. ............. 55/282.3; 55/522; 55/523; 55/524; 422/169; 422/170; 422/171; 422/172; 422/177; 422/178; 422/179; 422/180; 422/181; 422/182; 60/297

(58) Field of Classification Search .................. 55/282.3, 55/522–524; 422/169–172, 177–182; 60/297
See application file for complete search history.

(56) References Cited

U.S. PATENT DOCUMENTS

| | | | | |
|---|---|---|---|---|
| 2,942,932 A * | 6/1960 | Elliott | ............................. | 423/212 |
| 4,581,891 A * | 4/1986 | Usui et al. | ........................ | 60/286 |
| 4,677,823 A * | 7/1987 | Hardy | .............................. | 60/274 |
| 5,067,973 A * | 11/1991 | Pattas | ................................. | 95/12 |
| 5,125,231 A * | 6/1992 | Patil et al. | ........................ | 60/274 |
| 5,130,099 A * | 7/1992 | Schatz | ............................ | 422/175 |
| 5,373,696 A * | 12/1994 | Adamczyk et al. | ............. | 60/276 |
| 5,424,045 A * | 6/1995 | Orman et al. | .................. | 422/607 |
| 5,588,291 A * | 12/1996 | Maus et al. | ....................... | 60/274 |
| 5,603,216 A * | 2/1997 | Guile et al. | ....................... | 60/288 |
| 5,613,359 A * | 3/1997 | Zahn et al. | ....................... | 60/274 |
| 5,701,735 A * | 12/1997 | Kawaguchi | ....................... | 60/274 |
| 5,753,188 A * | 5/1998 | Shimoda et al. | ............... | 422/108 |
| 5,771,683 A * | 6/1998 | Webb | ................................ | 60/274 |

(Continued)

FOREIGN PATENT DOCUMENTS

DE   102 0050 552 40 A1   5/2007
EP   03 418 32 A2   4/1989

(Continued)

*Primary Examiner* — Amber Orlando
(74) *Attorney, Agent, or Firm* — Cozen O'Connor

(57) ABSTRACT

A method and to a device for the regeneration of a particle arranged in the exhaust gas train of an internal combustion engine. An exhaust gas stream to be cleaned is supplied to the at least one particle filter. At least in a regeneration mode, a predetermined amount of an exhaust gas stream to be heated is branched off from the exhaust gas stream upstream of an exhaust gas turbine of an exhaust gas turbocharger which branched-off stream, after it has been heated by a heater is mixed in the form of a heated exhaust gas stream at a point upstream of the at least one particle filter back into the residual gas stream which is coming from the exhaust gas turbine and which is at a lower temperature than that of the other stream.

6 Claims, 1 Drawing Sheet

U.S. PATENT DOCUMENTS

| | | | |
|---|---|---|---|
| 5,809,775 A * | 9/1998 | Tarabulski et al. | 60/274 |
| 5,937,637 A * | 8/1999 | Fujishita et al. | 60/274 |
| 5,948,683 A * | 9/1999 | Koermer et al. | 436/37 |
| 6,018,943 A * | 2/2000 | Martin et al. | 60/274 |
| 6,347,511 B1 * | 2/2002 | Haines | 60/274 |
| 6,378,298 B2 * | 4/2002 | Harima et al. | 60/288 |
| 6,568,179 B2 * | 5/2003 | Deeba | 60/298 |
| 6,742,328 B2 * | 6/2004 | Webb et al. | 60/285 |
| 6,843,966 B1 * | 1/2005 | Mahr | 422/172 |
| 6,851,256 B2 * | 2/2005 | Chamoto et al. | 60/280 |
| 6,928,807 B2 * | 8/2005 | Jacob et al. | 60/286 |
| 7,247,190 B2 * | 7/2007 | Miura | 95/278 |
| 7,521,025 B2 * | 4/2009 | Ohno et al. | 422/168 |
| 7,700,050 B2 * | 4/2010 | Bruck et al. | 422/180 |
| 7,984,609 B2 * | 7/2011 | Doring et al. | 60/286 |
| 8,061,128 B2 * | 11/2011 | Crosbie | 60/295 |
| 8,069,655 B2 * | 12/2011 | Carroll et al. | 60/286 |
| 2002/0155039 A1 * | 10/2002 | Itoh et al. | 422/171 |
| 2004/0047774 A1 * | 3/2004 | Suwabe et al. | 422/177 |
| 2004/0074231 A1 * | 4/2004 | Bruck | 60/297 |
| 2004/0096372 A1 * | 5/2004 | Minami | 422/171 |
| 2004/0139739 A1 * | 7/2004 | Kagenishi | 60/289 |
| 2006/0107649 A1 * | 5/2006 | Kamikawa et al. | 60/274 |
| 2006/0236680 A1 * | 10/2006 | Zhang et al. | 60/286 |
| 2007/0065350 A1 * | 3/2007 | Maus et al. | 422/180 |
| 2007/0220866 A1 * | 9/2007 | Nishiumi | 60/286 |
| 2008/0098723 A1 | 5/2008 | Carlill | |
| 2008/0120966 A1 * | 5/2008 | Sugiyama et al. | 60/287 |
| 2010/0064686 A1 * | 3/2010 | Mondori | 60/605.2 |

FOREIGN PATENT DOCUMENTS

EP        10 727 65 A2     7/2000

* cited by examiner

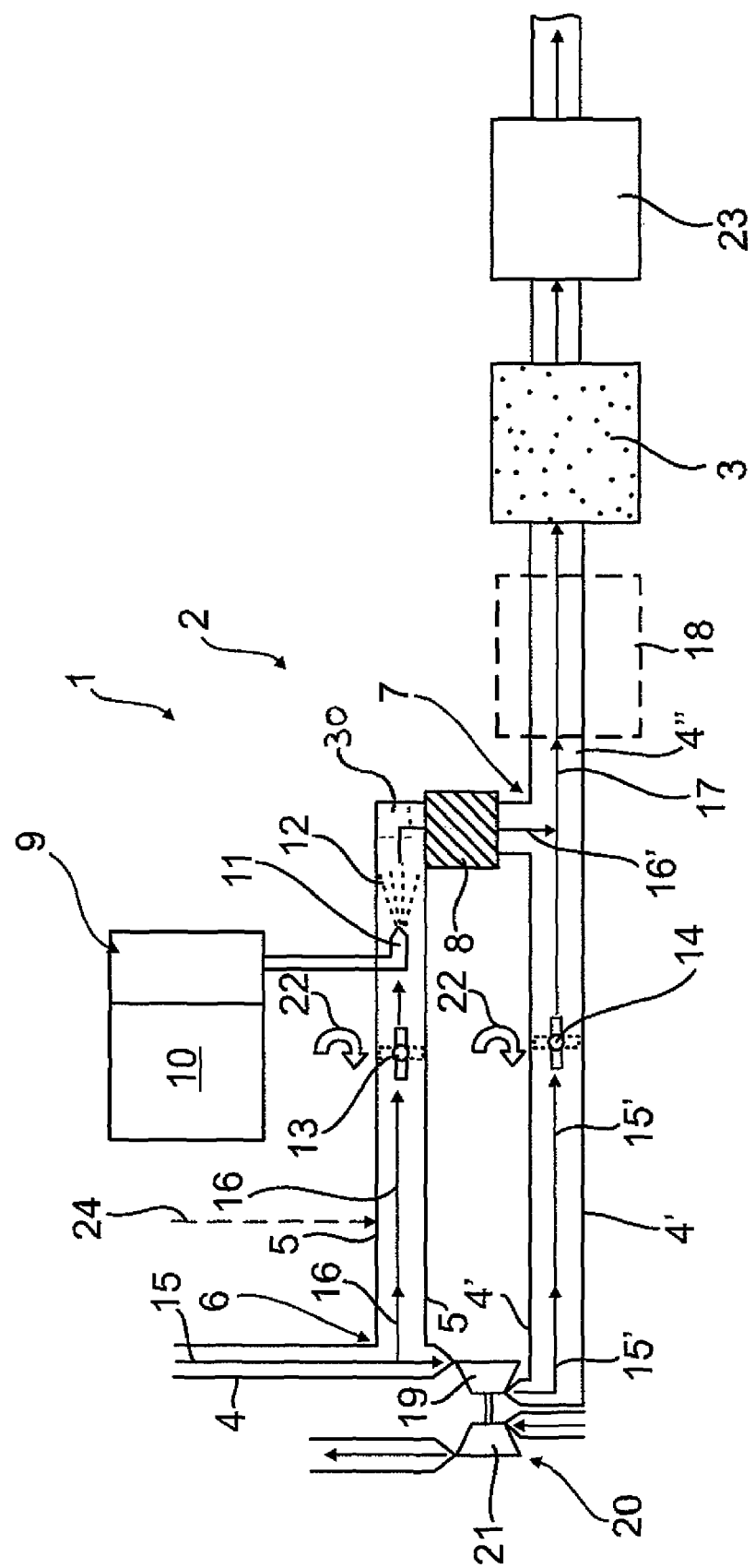

METHOD AND DEVICE FOR THE REGENERATION OF A PARTICLE FILTER ARRANGED IN THE EXHAUST GAS TRACT OF AN INTERNAL COMBUSTION ENGINE

BACKGROUND OF THE INVENTION

1. Field of the Invention

The present invention pertains to a method for the regeneration of a particle filter arranged in the exhaust gas tract of an internal combustion engine and to a device for the regeneration of a particle filter arranged in the exhaust gas tract of an internal combustion engine. The invention pertains in particular to a method and to a device for regenerating particle filters in internal combustion engines operating with excess air.

2. Description of the Related Art

To minimize the fine particles, "particle separators" or particle filters are used in motor vehicles. A particle separator arrangement for motor vehicles is known from, for example, EP 10 727 65 A2. These particle separators differ from particle filters in that the exhaust gas stream is conducted along the separator structures, whereas, in the case of particle filters, the exhaust gas is forced to flow through the filter medium. As a result of this structural difference, particle filters tend to clog, which increases the exhaust gas backpressure. Particle filters cause an undesirable increase in the pressure at the exhaust gas outlet of the internal combustion engine, which in turn reduces engine power and leads to an increase in the amount of fuel consumed by the internal combustion engine. An example of a particle filter arrangement is known from EP 03 418 32 A2.

In both of the previously described arrangements, an oxidation catalyst located upstream of the particle separator or particle filter oxidizes nitrogen monoxide (NO) in the exhaust gas to nitrogen dioxide ($NO_2$) with the help of the residual oxygen ($O_2$) also present in the exhaust gas according to the following equation:

$$2NO + O_2 <-> 2NO_2$$

In the particle filter, the $NO_2$ reacts with the solid carbon-containing particles to form CO, $CO_2$, $NO_2$, and NO and thus regenerates the filter. The strong oxidizing agent $NO_2$, makes it possible to achieve the continuous removal of the deposited fine particles know as passive regeneration. Nevertheless, this device and the way the method is implemented suffer from the disadvantage that a large amount of toxic $NO_2$ is formed and/or is present in the exhaust gas system.

To prevent the escape of $NO_2$ into the environment, care must therefore be taken to ensure that the area between the NO oxidation catalysts and the particle filters is sufficiently leak-proof. According to this method, not only $NO_2$ but also $SO_3$ is formed, the latter being produced on the platinum-containing NO oxidation catalysts from the sulfur in the fuel and/or motor oil. This $SO_3$ and the $NO_2$ condense on cold spots in the exhaust gas system and form highly corrosive sulfuric acid and nitric acid, so that the exhaust gas system must be made of high-grade steel up as far as the particle filter to avoid corrosion reliably.

It is also known that a particle filter can be regenerated by actively raising the exhaust gas temperature by supplying hydrocarbons (HC) and oxidizing them. For this purpose, DE 102 0050 552 40 A1, for example, describes a design in which an HC oxidation catalyst, a diesel particle filter, and then an SCR catalyst are arranged one after the other in the exhaust gas flow direction in the main exhaust gas train. A secondary exhaust gas train is also provided, which branches off from the main exhaust gas train upstream of the HC oxidation catalyst and which leads back into the main exhaust gas train after the diesel particle filter. A throttle for regulating the exhaust gas stream to be branched off, an oxidation catalyst, and a particle separator downstream of the oxidation catalyst are provided in the secondary exhaust gas train. In a design of this type, the throttle flap is kept closed during normal operation, so that all of the exhaust gas stream flows through the main exhaust gas train and is cleaned there. During a regeneration phase of the diesel particle filter in the main exhaust gas train, however, the throttle flap is opened to allow a portion of the exhaust gas stream to flow through the secondary exhaust gas train and thus bypass the diesel particle filter, after which the two exhaust gas streams, i.e., the stream flowing through the main exhaust gas train and the one flowing through the secondary exhaust gas train, are brought back together again at a mixing point upstream of the SCR catalyst.

As a result of this operating mode, the mass flow of exhaust gas through the diesel particle filter is decreased during the filter's regeneration phase, so that it is only necessary to raise the temperature of a smaller amount of exhaust gas, and the diesel particle filter can be regenerated with a smaller input of energy. In addition, by splitting the mass flow of exhaust gas into two parts and subsequently mixing the exhaust gas stream of the main exhaust gas train, which is at a high temperature, with the exhaust gas stream of the secondary exhaust gas train, which is at a low temperature, at the mixing point, the temperature of the exhaust gas stream flowing through the SCR catalyst can be reduced again. The particle separator in the secondary gas train, furthermore, prevents an exhaust gas stream from which soot particles have not been separated from leaving the exhaust gas train.

The hydrocarbons are added to the oxidation catalysts by an injection device directly upstream of the catalysts. Because, in a design of this type, the oxidation catalysts are oxidizing NO to $NO_2$ even during non-regeneration mode, passive filter regeneration with $NO_2$ takes place even in non-regeneration mode, although to only a small degree. This means that, $NO_2$ is formed even during non-regeneration mode, and this is then usually emitted without being used. Because of the toxicity of $NO_2$, this is impracticable and undesirable.

It is obvious that a design of this type has a relatively large number of parts, nor is it very compact, and thus overall it occupies a large amount of space.

SUMMARY OF THE INVENTION

It is a goal of the present invention is to make available a method and a device for the regeneration of a particle filter arranged in an exhaust gas train of an internal combustion engine by which particle filters can be regenerated effectively and reliably in a simple and compact manner.

According to one embodiment of the invention, during regeneration mode a predetermined quantity of an exhaust gas stream to be heated is branched off from the raw exhaust gas stream upstream of an exhaust gas turbine, for which purpose a branch line branches off from a feed line conducting the exhaust gas stream to the exhaust gas turbine. The exhaust gas stream to be heated is then heated in the branch line by means of a heater, preferably by means of at least one heating catalyst, wherein this heated exhaust gas stream is then, at a point upstream of the at least one particle filter, mixed as a heated exhaust gas stream back into the residual gas stream of lower temperature coming from the exhaust gas turbine. For this purpose, the branch line is brought together with or leads into an exhaust gas line leading away from the exhaust gas turbine and to the particle filter.

The residual exhaust gas stream, like the combined hot mixed stream, does not need to flow through an NO oxidation catalyst upstream of the particle filter, because, as a result of the withdrawal of the exhaust gas stream to be heated, the exhaust gas stream is at a much higher temperature level upstream of the exhaust gas turbine than downstream of the exhaust gas turbine. Thus, it is possible to achieve especially effective heating, especially through the use of an appropriate oxidation catalyst, to oxidize the hydrocarbons supplied to the exhaust gas stream to be heated. As a result of the exothermia of this reaction, it is possible to achieve effective thermal regeneration of the downstream particle filter having carbon-containing particles deposited thereon.

According to a preferred embodiment of the present invention, the heated exhaust gas stream is produced by at least one heating catalyst, which is arranged in the branch line. This heating catalyst is preferably designed as an oxidation catalyst, especially an HC oxidation catalyst. Hydrocarbons are supplied to this oxidation catalyst at a point upstream of it. The hydrocarbons which are supplied are preferably the hydrocarbons of the fuel from the fuel system of the vehicle, which is sprayed in ultrafinely distributed, i.e., atomized, form into the branch line upstream of the heating or oxidation catalyst by a metering device such as a nozzle or the like at predetermined times and in predetermined quantities. A heating or oxidation catalyst of this type comprises an active component which reacts exothermically with given components of exhaust gas stream, i.e., in the present case with the hydrocarbons, to produce a heated exhaust gas stream The elements of the platinum metal group and/or vanadium and/or tungsten and/or cerium are especially suitable as active components for an HC oxidation catalyst. These active components can be applied and/or used either alone or in combination with each other.

In a preferred embodiment, an exhaust gas stream to be heated can be branched off upstream of the at least one particle filter, in front of an exhaust gas turbine, wherein hydrocarbons are then supplied to the branched-off partial stream, which are then catalytically oxidized by an HC oxidation catalyst, so that the heated partial exhaust gas stream can be brought back together, at a point upstream of the at least one particle filter, with the residual gas stream coming from the exhaust gas turbine. The amount of exhaust gas actually branched off via a branch line during regeneration mode is preferably determined by an electronic open-loop and/or closed-loop control device in correspondence with predefined operating and/or regeneration parameters such that a given quantity of exhaust gas is branched off at given times. In concrete terms, the open-loop and/or closed-loop control device actuates a throttle device and/or shut-off device, which, is designed as a throttle flap and/or shut-off flap or a throttle valve and/or shut-off valve. Alternatively or in addition, the amount of exhaust gas to be branched off can be determined and/or adjusted by means of an exhaust gas turbine with variable turbine geometry. At least one of the throttle devices and/or shut-off devices provided, furthermore, can be designed to function simultaneously as a waste gate.

The throttle device and/or shut-off device are preferably arranged in the residual exhaust gas stream after the exhaust gas turbine and before the entry point of the branch line into the exhaust gas line coming from the exhaust gas turbine and/or in the branched-off exhaust gas stream upstream of the heating catalyst.

According to a preferred embodiment of the method, to minimize the amount of exhaust gas branched off via the feed or branch line during non-regeneration mode to a predetermined value, so that in particular essentially no exhaust gas stream at all is allowed to flow through the feed line. As a result, the formation of $NO_2$ and $SO_3$ by the oxidation of NO and $SO_2$ on the heating catalyst, preferably designed as an HC oxidation catalyst, is prevented or decreased. This shut-off possibility is also advantageous, because branching has the effect of decreasing the efficiency of the exhaust gas turbine.

To ignite the injected hydrocarbons, the exhaust gas stream to be heated is conducted over the heater, preferably designed as an HC oxidation catalyst, as a result of which the exhaust gas stream is heated. The heat output which can thus be achieved, however, is limited by the amount of oxygen present. If lambda reaches a value of 1, the oxidation of the hydrocarbons is no longer possible. To avoid this, fresh air is supplied to the exhaust gas stream to be heated after it has reached a certain predetermined temperature and/or after lambda has fallen below or reached a predetermined value. This optional fresh-air feed causes an increase in lambda and thus an increase in the heat output. The fresh air can be generally be branched off on the charging-air side; in concrete terms, it can be branched off downstream of an entry point of an exhaust gas return line into a charging-air line.

As a result of the addition of, for example, hydrocarbons, i.e., after the hydrocarbons have been added, the residual oxygen content in the exhaust gas stream which is to be heated and/or which has been heated can decrease very sharply as a result of the oxidation of the HC on the HC oxidation catalyst. Under certain conditions, therefore, the complete oxidation of all the hydrocarbons may not be possible any longer. To prevent this, the residual exhaust gas stream can be throttled, for example, downstream and/or upstream of the exhaust gas turbine but upstream of the point where the exhaust gas streams to be mixed are brought together, as a result of which more exhaust gas and thus more oxygen are conducted through the branch line. An oxygen sensor, furthermore, can also be installed in the area of the branch line, downstream and/or upstream of the heating catalyst, to detect the oxygen concentration in the exhaust gas stream. At least one temperature sensor can also be installed there.

In one embodiment the heating catalyst is arranged outside the exhaust gas train.

Under certain conditions, however, this can lead to the relatively rapid cooling of this heating catalyst. According to a preferred embodiment, therefore, the heating catalyst is arranged in the exhaust gas train in such a way that at least one exhaust gas stream flows around at least certain parts of it. In this case, the individual exhaust gas streams are fluidically isolated from each other.

To avoid high hydrocarbon concentrations downstream of the particle filter in cases where, hydrocarbons are used as oxidizing agents, the filter can be provided with a catalytically active coating for the oxidation of hydrocarbons. It is also conceivable that a catalyst with hydrocarbon oxidation activity could be installed downstream and/or upstream of the particle filter after the junction or entry point. To avoid unnecessarily high $NO_2$ and $SO_3$ emissions, the loading of these additional catalysts with active components and/or their volume is smaller than that of the at least one heating catalyst arranged in the branch line.

The entire system can be combined with additional catalysts for $NO_x$ reduction such as, for example, $NO_x$ storage catalysts and/or SCR catalysts, which can provided or installed preferably in the exhaust gas train downstream of the particle filter. Platinum and/or barium and/or calcium is preferred as the active component for the $NO_x$ storage catalysts. For the SCR catalysts, the use of tungsten oxide-stabilized vanadium pentoxide on a titanium dioxide base, iron zeolites, copper zeolites, or cobalt zeolites, is effective.

The activity of all the catalysts can be increased by the use of zeolites.

The at least one heating catalyst, preferably designed as an HC oxidation catalyst, is provided with NO oxidation activity, as a result of which the percentage of $NO_2$ produced during non-regeneration mode is be increased. In addition, particle filter regeneration within certain limits can be obtained with the help of $NO_2$. The quantities of $NO_2$ formed are smaller than those obtained from the use of NO oxidation catalysts installed upstream of the particle filter. Nevertheless, it should also be kept in mind in this connection that the HC oxidation catalyst having NO oxidation catalysts be designed with thermal stability similar to a pure NO oxidation catalyst. The HC oxidation catalyst with thermal stability results in turn in a lower degree of NO oxidation activity than that of a pure NO oxidation catalyst, for this reason, the amount of $NO_2$ that is produced remains lower.

The at least one particle filter can also be provided with NO oxidation activity.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below on the basis of a drawing:

FIG. 1 is a schematic diagram of a device from regeneration of a particle filter.

DETAILED DESCRIPTION OF THE PRESENTLY PREFERRED EMBODIMENTS

Purely by way of example, FIG. 1 a schematic diagram of an embodiment of an inventive regeneration device 1 for a particle filter 3, arranged in an exhaust gas train 2 of an internal combustion engine (not shown).

The exhaust gas train 2 comprises here a feed line 4, by means of which a raw exhaust gas stream, i.e., an exhaust gas stream 15, coming from the internal combustion engine, is conducted to an exhaust gas turbine 19 of an exhaust gas turbocharger 20, which also comprises a compressor 21. From this feed line 4, a branch line 5 branches off upstream of the exhaust gas turbine 19 at a branching point 6, wherein this branch line 5 is brought together at an entry point 7 upstream of the particle filter 3 with an exhaust gas line 4' coming from the exhaust gas turbine 19 to form a mixture line 4" leading to the particle filter 3.

An HC oxidation catalyst 8 is arranged in the branch line 5. Additionally, a sensor 30, configured as at least one of an oxygen sensor and a temperature sensor is arranged in branch line 5.

The regeneration device 1 also comprises a metering device 9 for fuel, which, as shown in highly schematic fashion, is connected to an open-loop and/or closed-loop control device 10. The metering device 9 comprises an injection nozzle 11 projecting into the branch line 5, through which, during regeneration mode, fuel 12 can be sprayed into the branch line 5 upstream of the HC oxidation catalyst 8 at predetermined times and in predetermined amounts under the open and/or closed-loop control of the control device 10.

As can also be derived from FIG. 1, a throttle flap 13 is also arranged upstream of the HC oxidation catalyst 8 in the area of the branch line 5, this flap 13 is also controlled by the open-loop and/or closed-loop control device 10. A throttle flap 14, which is also preferably controlled by the open-loop and/or closed-loop control device 10, is installed in the exhaust gas line 4' in the area between the exhaust gas turbine 19 and the entry point 7.

Depending on the position of the throttle flaps 13, 14, the quantity and mass of an exhaust gas stream 15 to be heated, i.e., the stream which is coming from the internal combustion engine and which is to be branched into the branch line 5, can be specified and/or automatically controlled. The maximum open positions of the throttle flaps 13, 14 are shown by the solid lines in FIG. 1, and the closed positions of the throttle flaps 13, 14 are shown by the dotted lines. The arrows designated "22" is intended to illustrate schematically the various adjustment possibilities of the throttle flaps 13, 14.

The exhaust gas stream to be heated 16 takes up the fuel or hydrocarbons sprayed into it along its flow route upstream of the HC oxidation catalyst 8 and, enriched with fuel, flows through the HC oxidation catalyst 8, in which an exothermic reaction or oxidation occurs. As a result of the exothermic reaction or oxidation, the exhaust gas stream 16 is heated to a predetermined temperature.

The heated exhaust gas stream 16' is then mixed back into the residual gas stream 15' coming from the exhaust gas turbine at the entry point 7 downstream of the HC oxidation catalyst 8, where the two exhaust gas streams 15', 16' mix together, so that, thereafter, after the two exhaust gas streams 15', 16' have been combined, a hot mixed stream 17 flows to the particle filter 3, where the carbon-containing soot particles deposited in the particle filter 3 are converted to CO, $CO_2$, $N_2$, and NO, as a result of which the particle filter 3 is regenerated.

In non-regeneration mode, the throttle flap 13 is actuated in such a way that it closes off the branch line essentially completely, so that no or nearly no exhaust gas stream arrives at the particle filter 3 via the branch line 5, and the efficiency of the charging group is not impaired. In this case, the throttle flap 14 is completely open.

During regeneration mode, the throttle flap 13 and also the throttle flap 14 are opened to such an extent that a predetermined amount of exhaust gas is branched off from the exhaust gas stream 15, and a hot mixed stream 17 is produced in the previously described manner, which then is conducted to the particle filter 3 to regenerate it.

In the event that, as a result of the addition of the fuel 12 in the branch line 5, the residual oxygen content in the exhaust gas stream 16 decreases too much and the hydrocarbons are no longer being completely oxidized on the HC oxidation catalyst, the throttle flap 14 can be closed to a greater or lesser extent and the throttle valve 13 opened, as a result of which the exhaust gas stream 15' passing through the residual exhaust gas line 4' is severely throttled, so that a larger amount of exhaust gas flows through the branch line 5 and thus over the HC oxidation catalyst 8 to the particle filter 3. Similarly, as symbolized by the fresh-air line 24 shown in dashed line, a charging air-side fresh-air stream can be mixed into the exhaust gas stream 16 to be heated at predetermined times and/or when specified exhaust gas stream temperatures are reached during regeneration mode to achieve a further increase in the heat output by means of an increase in the amount of oxygen available for the oxidation of an increased amount of hydrocarbons.

The exhaust gas quantity to be heated 16 can also be changed by the use of a variable turbine geometry (VTG). As a result of the adjustment of this geometry, the exhaust gas backpressure upstream of the exhaust gas turbine 19 can be varied.

In the present example, an $NO_x$ reduction catalyst 23, such as an SCR catalyst, is installed downstream of the particle filter 3.

As indicated only in dashed line in FIG. 1, furthermore, an additional HC oxidation catalyst 18 can be provided downstream of the entry point 7 and upstream of the particle filter 3, by means of which high hydrocarbon concentrations downstream of the particle filter 3 can be reliably avoided. Alternatively or in addition, it is also possible to provide the particle filter 3 itself with an appropriate active component.

The throttle flap 13, furthermore, can also operate here as a waste gate and thus fulfill an advantageous double function.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for the regeneration of a particle filter arranged in an exhaust gas train of an internal combustion engine, the method comprising:
    branching off, upstream of an exhaust gas turbine of an exhaust gas turbocharger, a predetermined amount of the exhaust gas stream to be heated in a regeneration mode;
    heating the branched-off exhaust gas stream by a heater;
    mixing the heated branched-off exhaust gas stream with a residual gas stream from the exhaust gas turbine at a feed point upstream of the particle filter, the residual gas stream being at a lower temperature than the heated branched-off exhaust gas stream;
    supplying the mixed exhaust gas stream to the particle filter;
    actuating by a control device at least one of a throttle device and a shut-off device in the branched-off exhaust gas stream or in the residual exhaust gas stream downstream of the exhaust gas turbine such that, as a function of at least one of predetermined operating parameters and regeneration parameters, a predetermined amount of exhaust gas is branched off at predetermined times from the residual exhaust gas stream upstream of the exhaust gas turbine,
    wherein if an oxygen content of the branched-off exhaust gas stream to be heated falls below a predetermined oxygen limit value during the regeneration mode, the control device at least one of shuts off and throttles the residual exhaust gas stream downstream of the branching point but upstream of the feed point by the at least one of the throttle device and the shut-off device such that a predetermined amount of exhaust gas is branched off from the exhaust gas stream upstream of the exhaust gas turbine as a function of the oxygen content of the exhaust gas stream and is sent to the at least one heater to the heat the branched-off exhaust gas stream.

2. The method according to claim 1, wherein the residual gas stream does not flow through an NO oxidation catalyst downstream of the exhaust gas turbine and upstream of the feed point and the mixed exhaust gas stream does not flow through a NO oxidation catalyst downstream of the feed point and upstream of the particle filter.

3. The method according to claim 1, wherein the heated branched-off exhaust gas stream is produced by at least one heating catalyst serving as a heater, the heater comprises at least one active component which enters into an exothermic reaction with predetermined components of the exhaust gas stream thereby heating the exhaust gas stream.

4. The method according to claim 3, wherein the at least one heating catalyst is an HC oxidation catalyst, through which an exhaust gas stream loaded with hydrocarbons to be heated flows, the method further comprising: heating the exhaust gas stream loaded with hydrocarbons by exothermic reaction of the hydrocarbons in the HC oxidation catalyst, wherein a metering device meters hydrocarbons into the exhaust gas stream to be heated upstream of the heating catalyst at predetermined times and in predetermined amounts under control of control device.

5. The method according to claim 1, wherein the at least one of the throttle device and the shut-off device are configured to function simultaneously as a waste gate and in a non-regeneration mode, at least one of the at least one throttle device and the shut-off device substantially prevents the branching off of the exhaust gas stream or reduces the branching off of the exhaust gas stream to a predetermined minimum value.

6. The method according to claim 1, further comprising supplying a fresh-air stream to the exhaust gas stream to be heated after at least one of a predetermined heating temperature measured in the heated exhaust gas stream has been reached and a predetermined lambda value has been reached.

* * * * *